United States Patent
Yoshimoto et al.

(10) Patent No.: US 7,038,866 B2
(45) Date of Patent: May 2, 2006

(54) OPTICAL MODULE

(75) Inventors: Kenji Yoshimoto, Yokohama (JP); Hiroyasu Sasaki, Yokohama (JP); Masanobu Okayasu, Yokohama (JP); Toshiaki Takai, Yokohama (JP); Naoki Matsushima, Yokohama (JP)

(73) Assignee: Opnext Japan, Inc., Kanagawa (JP)

( * ) Notice: Subject to any disclaimer, the term of this patent is extended or adjusted under 35 U.S.C. 154(b) by 0 days.

(21) Appl. No.: 11/127,179

(22) Filed: May 12, 2005

(65) Prior Publication Data

US 2005/0275958 A1    Dec. 15, 2005

(30) Foreign Application Priority Data

Jun. 11, 2004 (JP) ............... 2004-173611

(51) Int. Cl.
*G02B 7/02* (2006.01)
(52) U.S. Cl. ............ 359/820; 359/819; 385/92; 385/94; 385/85
(58) Field of Classification Search ........... 359/819, 359/820, 823, 821; 385/92, 93, 94, 85
See application file for complete search history.

(56) References Cited

U.S. PATENT DOCUMENTS 6,404,042 B1 *  6/2002  Sone et al. ........... 257/678
2004/0091011 A1 *  5/2004  Liu ..................... 372/46

FOREIGN PATENT DOCUMENTS

JP     11-218648    8/1999
JP    2001-272572   10/2001

* cited by examiner

*Primary Examiner*—Ricky L. Mack
*Assistant Examiner*—Brandi Thomas
(74) *Attorney, Agent, or Firm*—McDermott Will & Emery LLP

(57) ABSTRACT

The present invention provides a compact, highly reliable optical module in which a light-emitting element and optical modulator element that differ from each other in thermal expansion coefficient are mounted in one casing. In the optical module having a differential thermal expansion coefficient less than $5 \times 10^{-6}$ [1/K] between the light-emitting element and the casing, and a differential thermal expansion coefficient of at least $5 \times 10^{-6}$ [1/K] between the optical modulator element and the casing, a section at which the optical modulator element and the casing are fixed is equal to or less than 10 mm wide in the direction of an optical axis.

13 Claims, 4 Drawing Sheets

OPTICAL MODULE

CLAIM OF PRIORITY

The present application claims priority from Japanese patent application serial no. 2004-173611, filed on Jun. 11, 2004, the content of which is hereby incorporated by reference into this application.

BACKGROUND OF THE INVENTION

The present invention relates to an optical module, and more particularly, to an optical module in which a light-emitting element and an optical function element formed with an optical waveguide are mounted in one casing.

Optical function elements whose substrates are constructed using lithium niobate ($LiNbO_3$), lithium tantalate ($LiTaO_3$), or the like, are used as modulators in optical communications for use mainly in high-speed regions exceeding a transmission rate of 10 Gbits/s. The optical function elements using the foregoing materials have been mounted in hermetically sealed casings each separate from the casing of a semiconductor laser diode element. This form of mounting has been mainly due to the difference in thermal expansion coefficient (a) between the optical function element and the semiconductor laser diode element.

Luminous elements represented by semiconductor laser diode elements have hitherto been mounted in packages formed of materials whose thermal expansion coefficients are much the same as those of optical function elements. Output light from these light-emitting elements is fiber-emitted via condensing lenses.

Similarly, the optical function elements formed with an optical waveguide having an electro-optical effect have also been mounted in packages formed of materials almost equivalent to the optical function elements in terms of thermal expansion coefficient. The light-incident/exit sections of such an optical function element are coupled to fibers via lenses or directly fiber-coupled using a bonding agent or the like.

Polarization-maintaining fibers are used to admit fiber-introduced light into the optical function element that has polarization direction dependence. To make the light from a light-emitting element enter the optical function element, the polarization-maintaining fiber inside the light-emitting element package and the polarization-maintaining fiber at the input side of the optical function element package have been coupled to each other using connectors or splices.

Japanese Patent Laid-open No. 11-218648 describes an optical composite module having a light-emitting element and an optical function element housed in welded respective independent packages. This optical composite module does not need to have a plane-of-polarization preserving fiber between the light-emitting element and the optical function element.

Also, Japanese Patent Laid-open No. 2001-272572 describes a method for mounting an optical function element module of a structure in which the input end and output end of an optical function element are fixed to a fiber and this fiber is further fixed to a package.

As mentioned above, a space for connecting fibers is needed to connect a module that has a mounted a light-emitting element such as a laser diode, and a module with a mounted optical function element such as an optical modulator. Also, an expensive polarization-maintaining fiber and polarization direction matching are required in order to connect both modules while maintaining the plane of polarization. Therefore, partly to reduce dimensions by reducing space requirements, and to reduce costs by dispensing with a polarization-maintaining fiber, it is necessary to mount both the light-emitting element and the optical function element in one package.

However, mounting both the light-emitting element and the optical function element in one casing (package) made of a material whose thermal expansion coefficient significantly differs from those of the two elements will deteriorate reliability and characteristics of the elements.

SUMMARY OF THE INVENTION

To mount a light-emitting element and a light optical function in one casing in an optical module of the present invention, this casing has a thermal expansion coefficient almost equal to that of the light-emitting element. Accordingly, a conventional mounting method can be adopted intact to mount the light-emitting element. Since the optical function element and the casing significantly differ from each other in thermal expansion coefficient, however, during mounting of the optical function element in the casing, part of the optical function element is fixed to alleviate the thermal stresses thereon that will arise from changes in the temperature of the casing. In the optical module having a differential thermal expansion coefficient of at least $5 \times 10^{-6}$ [1/K] between the optical function element and the casing, the section at which the optical function element and the casing are fixed to each other has a width within 10 mm.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Preferred embodiments of the present invention will be described using the drawings. The optical function element described below is an element that modifies optical properties in accordance with external control signals for electricity, light, stresses, and the like. The following description of embodiments will be given assuming that an optical modulator element (intensity modulator) is used as an example of the optical function element. However, the optical function element is not confined to the above modulation function and includes the switch and deflector functions that use an electro-optical effect, and a wavelength converter function that uses a nonlinear optical effect. Also, the optical modulator element includes not only intensity modulation, but also phase modulation and deflection modulation.

Figure 1:
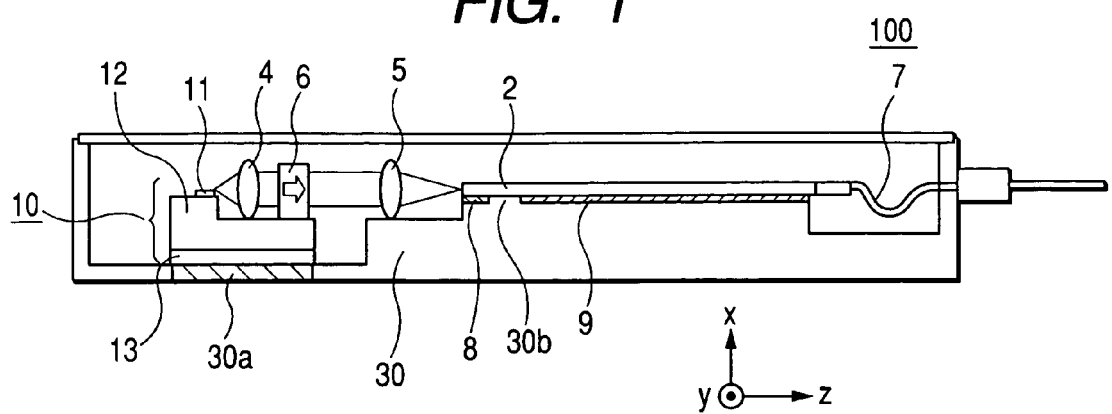
FIG. 1 is a sectional view of an optical module, explaining a first embodiment of the present invention.

A first embodiment of the present invention will be described using FIG. 1. FIG. 1 is a sectional view showing major sections of an optical module. The optical module 100 shown in FIG. 1 has a light-emitting element 11 that uses a semiconductor laser, and an optical modulator element 2 that uses lithium niobate, both the light-emitting element 11 and the optical modulator element 2 being mounted in a hermetically sealed casing 30. The light-emitting element 11 is made of a GaAs-based material whose thermal expansion coefficient is $4-6 \times 10^{-6}$ [1/K]. A light-emitting element unit 10 on which the light-emitting element 11 is mounted, therefore, includes a submount 12 made of aluminum nitride whose thermal expansion coefficient is almost the same as the light-emitting element 11. The submount 12 is mounted on a thermoelement 13 having a Peltier effect for releasing heat from the light-emitting element 11.

The material forming the casing 30 is a FeNiCo alloy having a thermal expansion coefficient of $4.4 \times 10^{-6}$ [1/K] that is almost the same as for the submount 12. However, a section 30a which forms part of the casing 30 and on which the light-emitting element unit 10 is mounted for its heat release is made of a CuW alloy substantially equal to the above material in terms of thermal expansion coefficient (more specifically, $6 \times 10^{-6}$ [1/K]) and low in heat resistance. A lens 4 for collimating the light emitted from the light-emitting element 10 is also mounted thereon. Collimated light is condensed by a condensing lens 5 mounted in the casing 30, and enters the optical function element 2. The optical modulator element 2 is a lithium-niobate single-crystal substrate having an electro-optical effect. An isolator 6 for shutting off return light, and a retardation plate (not shown) that matches propagation modes of the light-emitting element unit 10 and the optical modulator element 2 are mounted between the collimating lens 4 and the condensing lens 5.

In the following description, an exit direction of light from the optical module 100 is taken as a Z-axis (Z-direction), a direction vertical on the paper of FIG. 1 and facing to the front (toward a viewer of the drawing), as a Y-axis (Y-direction), and an upward direction on the paper, as an X-axis (X-direction). The optical modulator element 2 is positioned in the X-direction by being pressed in parallel against a section 30b, part of the casing 30, from top. The optical modulator element 2 is positioned in the Z- and Y-directions so as to have an end matched with a focal point of the condensing lens 5. After positioning, a bonding agent 8 that has been applied to the optical modulator element 2 beforehand is solidified to fix the modulator element 2 to the casing 30. At this time, a clearance between an output side of the casing 30 from the section 30b, and the optical modulator element 2, is filled in with soft resin 9. In this case, the section precoated with the bonding agent is 3 mm wide in the Z-direction.

At a light-exit end of the optical modulator element 2, a single-mode optical fiber 7 is bonded using an optical bond, and the optical fiber and the casing 30 are fixed by being sealed with solder. In order to prevent disconnections of the single-mode optical fiber during bonding, this optical fiber provided between the light-exit end of the optical modulator element 2 and the casing 30 has a surplus length to allow for changes in elasticity due to the difference in thermal expansion coefficient between the optical modulator element 2 and the casing 30.

The above-described construction structurally completes the optical module 100 having the light-emitting element 11 and the optical modulator element 2 mounted in the same casing. Electrical signal wiring, although not shown, is provided so that: the light-emitting element 11 continuously emits light, and the light introduced into the optical modulator element 2 is intensity-modulated and output as signal light through the single-mode optical fiber 7.

In the optical module of the present embodiment, the light-emitting element 11 and the optical modulator element 2 substantially differ from each other in thermal expansion coefficient. A material having almost the same thermal expansion coefficient as that of the light-emitting element 11 is selected for the casing 30. This is because of the following reasons. Since the light-emitting element uses condensing optics, mounting the light-emitting element in the casing having a significantly different thermal expansion coefficient would lead to shifts in a position of the condensing optics due to changes in ambient temperature, and hence, changes in coupling efficiency of the light condensed on the optical function element. According to a rule of thumb of the present inventors, the difference in thermal expansion coefficient between an element and the mounting section for that element needs to be less than $5 \times 10^{-6}$ [1/K].

For the above reasons, the optical module of the present embodiment substantially differs in thermal expansion coefficient between the optical modulator element 2 and the casing 30. Lithium niobate, the material of the optical modulator element 2, has its Z-axial thermal expansion coefficient of $16 \times 10^{-6}$ [1/K]. When this optical modulator element is mounted in the casing 30 of the FeNiCo alloy having an thermal expansion coefficient of $4.4 \times 10^{-6}$ [1/K], the difference in thermal expansion coefficient is $11.6 \times 10^{-6}$ [1/K]. A storage temperature range of the optical module is from $-40°$ C. to $85°$ C. (in terms of spread, therefore, $125°$ C.). The optical modulator element 2 has a maximum Z-axial length of 100 mm. The differential displacement calculated from their product, therefore, is a maximum of 145 μm (micrometers). Accordingly, extremely significant distortion or strain will occur if the optical modulator element 2 and the casing 30 are bonded over an entire longitudinal length of the optical modulator element.

In actuality, however, in the first embodiment, since only 3 mm of the optical modulator element 2 from its light-incident end is bonded onto the casing 30, the incident end becoming a focal position of the condensing lens 5 is immobilized. Also, sections other than the bonded section (fixing position) permit relative movement in the Z-axis direction. Thus, thermal stresses on the optical modulator element 2 can be minimized while at the same time maintaining light-coupling efficiency of the optical modulator element 2.

In the first embodiment, the optical modulator element 2 has a cantilever-connected structure, and this makes the optical module more or less weak against mechanical external pressures such as shocks or vibration. Therefore, at least part of the clearance at the optical modulator element 2, except for the fixed section thereof, is filled in with soft resin 9 to make the structure not easily permit physical stressing due to changes in Z-axial elasticity.

Although the optical modulator element 2 and the casing 30 are bonded with a Z-axial width of 3 mm in the first embodiment, it is already experimentally confirmed that defects in characteristics do not occur with up to Z-axial widths of 10 mm.

According to the present embodiment, it is possible to provide a compact, highly reliable optical module in which the light-emitting element and optical function element that differ from each other in thermal expansion coefficient are mounted in one casing.

While lithium niobate is used as the material of the optical function element, lithium tantalate may be used instead. Although the light-emitting element 11 uses a GaAs-based material, an InP-based material or any other suitable compound semiconductor material may be used instead. While the submount uses aluminum nitride as its material, any other material such as alumina, CuW alloy, or FeNiCo alloy may be used instead, if the difference in thermal expansion coefficient between the material used and the light-emitting element is less than $5 \times 10^{-6}$ [1/K]. While the isolator and the retardation plate are mounted in or on the light-emitting element 10, both may be mounted in the casing 30 that contains the condensing lens 5. The retardation plate is unnecessary if this is allowable by a particular cutting direction of the optical function element 2. Connection between the optical function element 2 and the casing 30 does not always need to use the bonding agent 8 and may use solder instead. These modifications also apply to other embodiments described in this specification.

Figure 2A:
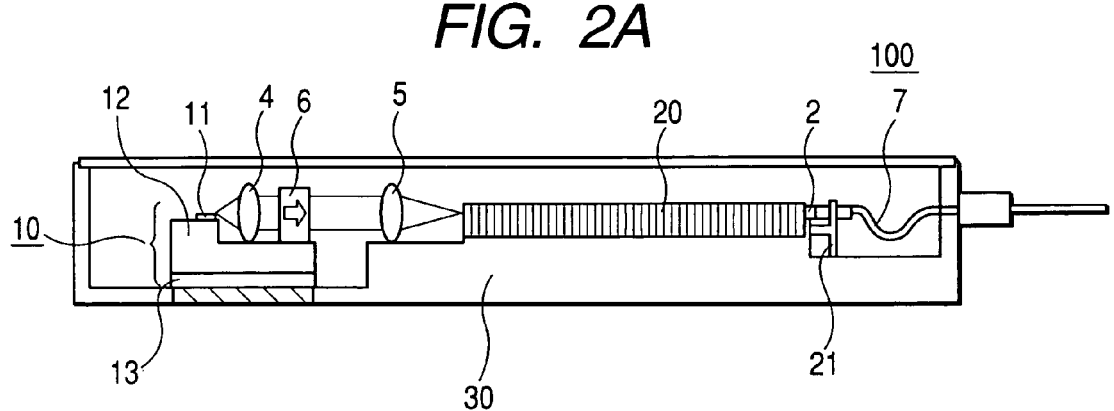
FIGS. 2A and 2B are structural views of another optical module, explaining a second embodiment of the present invention.
Figure 2B:
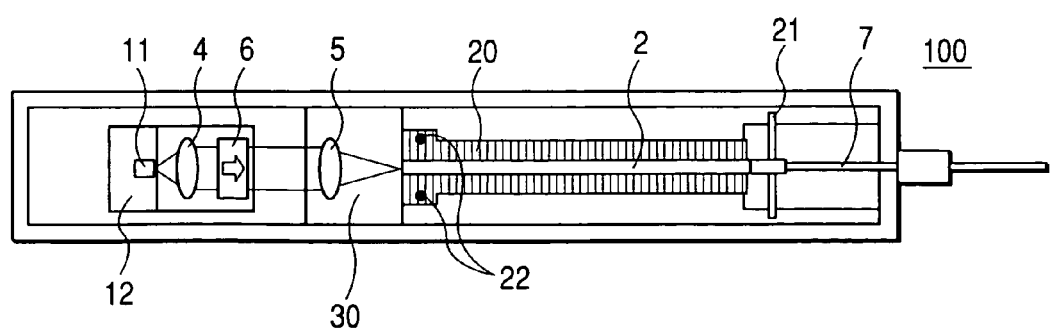
Figure 3:
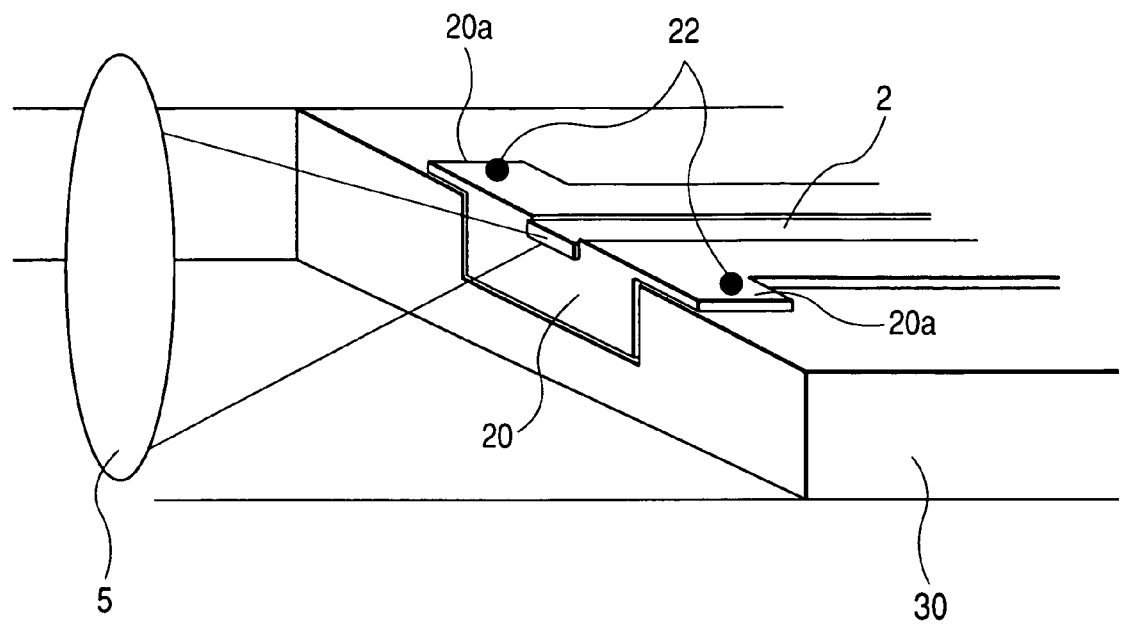
FIG. 3 is a perspective view explaining the optical module in the second embodiment of the present invention.
Figure 4:
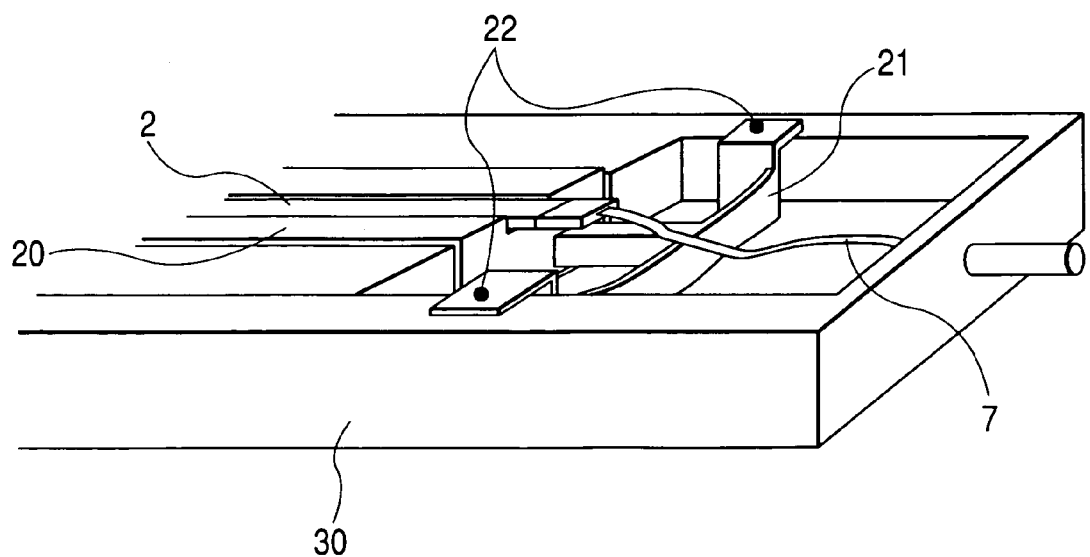
FIG. 4 is another perspective view explaining the optical module in the second embodiment of the present invention.

A second embodiment of the present invention will be described using FIGS. 2A, 2B, 3 and 4. FIGS. 2A and 2B are structural views of another optical module, FIG. 2A is a sectional view showing major sections of the optical module, and FIG. 2B is a plan view showing the major sections of the optical module. FIG. 3 is a perspective view explaining a light-incident section of an optical modulator, and FIG. 4 is a perspective view explaining a light-exit section of the optical modulator.

In this specification, the same reference number is assigned to the same section. In the second embodiment of the optical module 100 shown in FIG. 2, a region from a light-emitting element unit 10 to a condensing lens 5 is also of the same structure as that of the first embodiment. Therefore, a description of this region will be omitted and only a mounting structure of an optical modulator element 2 will be described.

In the second embodiment, the optical modulator element 2 is mounted on a mount 20 made of a material whose thermal expansion coefficient is essentially the same as that of the optical modulator element 2. The optical modulator element 2 in the present embodiment is formed of lithium niobate, whose Z-axial thermal expansion coefficient is about $16 \times 10^{-6}$ [1/K]. The mount 20 uses stainless steel whose thermal expansion coefficient is $14-17 \times 10^{-6}$ [1/K]. It is unnecessary to pay careful attention to a method of fixing the optical modulator element 2 and the mount 20, since a differential thermal expansion coefficient between both is $2 \times 10^{-6}$ [1/K] or less. In the present embodiment, the optical modulator element 2 and the mount 20 are fixed using a bonding agent. The mount 20 is grooved with such a depth that when the mount 20 is fixed to a casing 30, an X-axial position of the light-incident section of the optical modulator element becomes flush with a weld-fixed surface of the casing 30. The reason for this will be described later herein.

If the mount 20 is mounted in the casing 30 of a FeNiCo alloy whose thermal expansion coefficient is $4.4 \times 10^{-6}$ [1/K], a differential thermal expansion coefficient between both is at least $5 \times 10^{-6}$ [1/K]. In the second embodiment, as shown in FIG. 3, the casing 30 has a groove deep enough to accommodate the mount 20, and the mount 20 and the casing 30 are spot-welded with a YAG laser at lugs 20a of the mount 20. Two sections on one side are welded with a spot diameter of 0.4 mm and at a pitch of 2 mm (however, one section only is shown).

At this time, a Z-axial laser weld (fixing position) is in immediate proximity to a light-incident end of the optical modulator element 2. The casing 30 has a groove that allows it to accommodate a mount section, except for the lugs 20a of the mount 20. Also, the mount 20 is grooved with such a depth that when the mount 20 is fixed to the casing 30, an X-axial position of the optical modulator element 2 on its optical axis becomes flush with the weld-fixed surface of the casing 30. The following describes the reason in a little further detail. As previously mentioned, the light-incident end of the optical function element and the position at which the mount is fixed to the casing are approximately matched in height. Thus, optical-axis decentering in the X-direction occurs with dependence only on contraction/expansion of the casing 30 which is smaller than the mount in thermal expansion coefficient and in the difference of height due to the difference in mounting position inside the module, not on thermal expansion of the mount which is greater in thermal expansion coefficient. This suppresses not only Z-axial, but also X-axial shifts in the position of the optical modulator element 2 greater in thermal expansion coefficient, thus minimizing shifts in a position of condensing optics and reducing changes in light-coupling efficiency of the optical modulator element 2.

In the second embodiment, as set forth in FIG. 4, at a light-exit end of the optical modulator element 2, a single-mode optical fiber 7 is bonded using an optical bond, and the optical fiber and the casing 30 are fixed by being sealed with solder. In order to prevent disconnections of the single-mode optical fiber during bonding, this optical cable provided between the light-exit end of the optical modulator element 2 and the casing 30 has a surplus length to allow for changes in elasticity due to the difference in thermal expansion coefficient between the optical modulator element 2 and the casing 30. Also, a rear end of the mount 20 with the optical modulator element 2 mounted thereon is fixed in the state where the rear end is Z-axially elasticized by a plate spring 21 fixed to the casing 30 having YAG welds 22. This strengthens the optical module against mechanical external pressures such as shocks and vibration, since the mount 20 in the second embodiment is of a cantilever-connected structure with respect to the casing 30. Similarly to the first embodiment, clearances between the mount 20 and the casing 30 may be filled in with soft resin 9 which does not easily permit physical stressing due to changes in Z-axial elasticity. Also, a plate spring may be used to suppress displacement of the optical modulator element in the X-axial direction, not in the Z-axial direction. In addition, YAG welding may be replaced by other fixing methods (e.g., fixing with screws).

The above-described construction structurally completes the optical module 100 having the light-emitting element 11 and the optical modulator element 2 mounted in the same casing. Electrical signal wiring, although not shown, is provided so that: the light-emitting element 11 continuously emits light, and the light introduced into the optical modulator element 2 is intensity-modulated and output as signal light through the single-mode optical fiber 7.

According to the present embodiment, it is possible to provide a compact, highly reliable optical module in which the light-emitting element and optical function element that differ from each other in thermal expansion coefficient are mounted in one casing.

In the present embodiment, an optical module whose light-coupling efficiency is further improved can be provided since consideration is also given to X-axial shifts in position.

Figure 5:
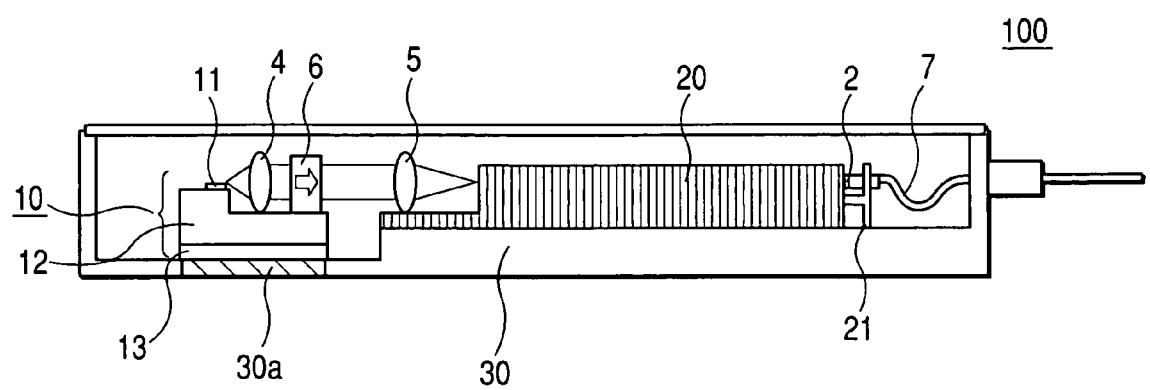
FIG. 5 is a sectional view of yet another optical module, explaining a third embodiment of the present invention.
Figure 6:
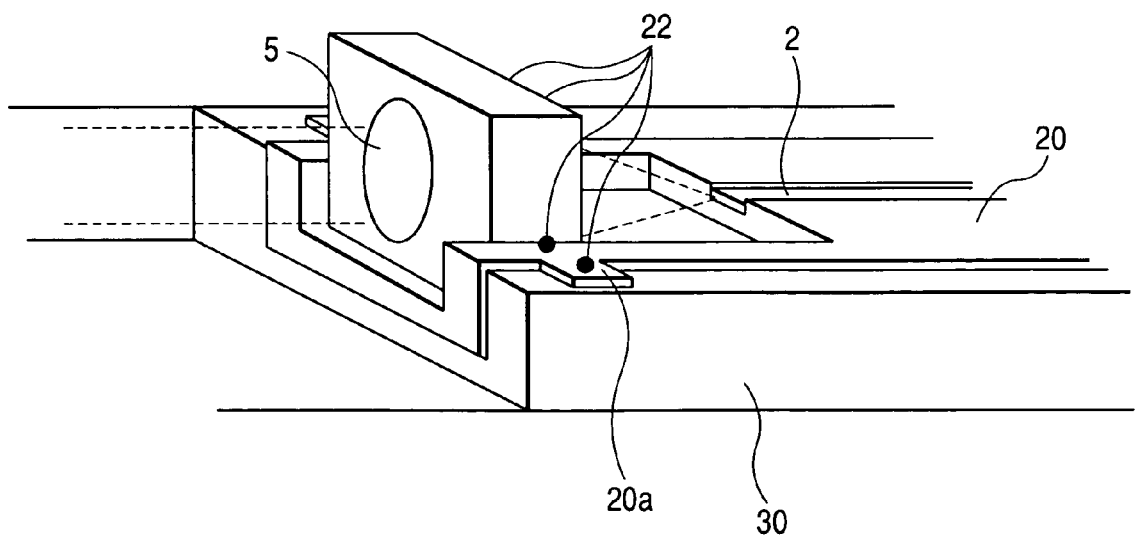
FIG. 6 is a perspective view explaining the optical module in the third embodiment of the present invention.

A third embodiment of the present invention will be described using FIGS. 5 and 6. FIG. 5 is a sectional view showing major sections of yet another optical module. FIG. 6 is a perspective view explaining a light-incident section of an optical modulator.

The optical module of the third embodiment is of a configuration in which a condensing lens 5 for admitting light from a light-emitting element 11 into an optical modulator element 2 is added as one of the components mounted on the mount 20 of the optical module according to the second embodiment. As shown in detail in FIG. 6, a mount 20 and a casing 30 are spot-welded with a YAG laser, at lugs 20a of the mount 20. Two sections on one side are welded with a spot diameter of 0.4 mm and at a pitch of 2 mm (in a Y-direction).

At this time, a Z-axial laser weld is present at a mounting position of the condensing lens 5. The casing 30 has a groove that allows it to accommodate a mount section, except for the lugs 20a of the mount 20. Also, the mount 20 is grooved with such a depth that when the mount 20 is fixed to the casing 30, an X-axial position of the optical modulator element 2 on its optical axis becomes flush with the weld-fixed surface of the casing 30. In addition, at the mounting position of the condensing lens 5, there is a groove with such a depth that an X-axial position of the condensing lens 5 on its optical axis becomes flush with the weld-fixed surface of the casing 30. This suppresses not only Z-axial, but also X-axial shifts in the position of the optical modulator element 2 having a great thermal expansion coefficient, thus minimizing shifts in a position of condensing optics and reducing changes in light-coupling efficiency of the optical modulator element 2.

The YAG welds are not always at the mounting position of the condensing lens 5 only. The welds may be at a light-incident edge of the optical modulator element 2 or may be between the mounting position of the condensing lens 5 and the light-incident edge of the optical modulator element 2. Furthermore, the welds, if provided within a Z-axial distance of 10 mm, may be at both the mounting position of the condensing lens 5 and the light-incident edge of the optical modulator element 2.

The above-described construction structurally completes the optical module 100 having the light-emitting element 11 and the optical modulator element 2 mounted in the same casing. Electrical signal wiring, although not shown, is provided so that: the light-emitting element 11 continuously emits light, and the light introduced into the optical modulator element 2 is intensity-modulated and output as signal light through a single-mode optical fiber 7.

According to the present embodiment, it is possible to provide a compact, highly reliable optical module in which the light-emitting element and optical function element that differ from each other in thermal expansion coefficient are mounted in one casing.

In the present embodiment, an optical module whose light-coupling efficiency is further improved can be provided since consideration is also given to X-axial shifts in position.

Figure 7:
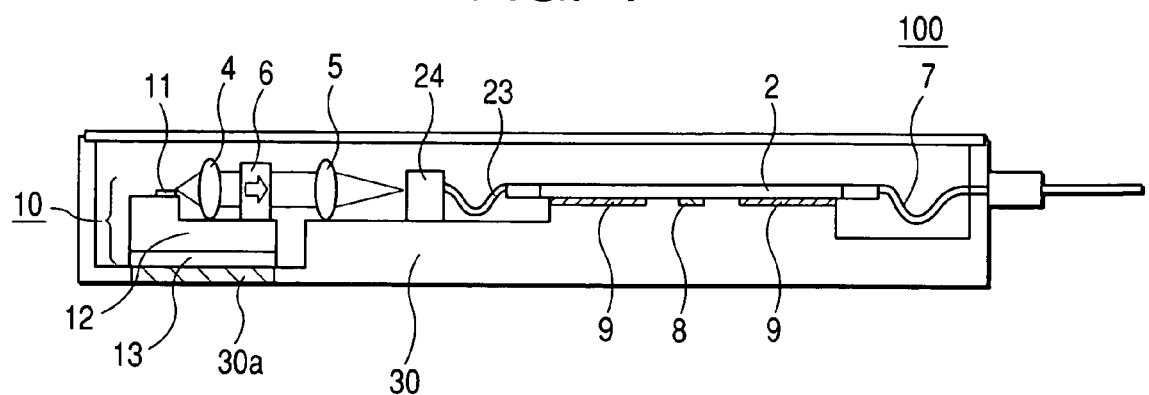
FIG. 7 is a sectional view of a further optical module, explaining a fourth embodiment of the present invention.

A fourth embodiment of the present invention will be described using FIG. 7. FIG. 7 is a sectional view of major sections of a further optical module, explaining a structure thereof.

In the optical module of the fourth embodiment, a Z-coordinate of a central position at the section where the optical modulator element 2 and casing 30 in the optical module of the first embodiment are fixed is much the same as a Z-axial central coordinate of the optical modulator element 2. The optical modulator element 2 and the casing 30 are fixed by bonding, and the fixing section has a Z-axial width of 3 mm. Although a region from a light-emitting element 11 to a condensing lens 5 is structurally similar to that of the first embodiment, a folder 24 for fixing a polarization-maintaining fiber 23 is provided at rear of the condensing lens 5. Light that has been condensed on a polarization-maintaining fiber 23 by the condensing lens 5 is introduced into the polarization-maintaining fiber 23. The polarization-maintaining fiber 23 and a light-incident end of the optical modulator element 2 are connected to each other using an optical bonding agent. As with a single-mode optical fiber 7 connected to a light-exit end of the optical modulator element 2, the polarization-maintaining fiber 23 has a surplus length to prevent its disconnections by compensating for changes in elasticity due to the difference in thermal expansion coefficient between the optical modulator element 2 and the casing 30. The light-incident/exit ends of the optical modulator element 2 are fiber-connected. The Z-coordinate of the central position at the section where the optical modulator element 2 and the casing 30 are fixed is much the same as the Z-axial central coordinate of the optical modulator element 2. Optical-fiber disconnections are thus prevented. In order to strengthen the optical module against mechanical external pressures such as shocks and vibration, at least part of a clearance, except for the section at which the optical modulator element 2 is fixed, is filled in with soft resin 9 which does not easily permit physical stressing due to changes in Z-axial elasticity.

The plate spring mentioned in connection with FIG. 4 of the second embodiment may be provided at the light-incident end of the optical modulator element. Also, the plate spring may be used to suppress displacement of the optical modulator element in the X-axial direction, not in the Z-axial direction. This also applies to the fifth embodiment described later herein.

The above-described construction structurally completes the optical module 100 having the light-emitting element 11 and the optical modulator element 2 mounted in the same casing. Electrical signal wiring, although not shown, is actually provided so that: the light-emitting element 11 continuously emits light, and the light introduced into the optical modulator element 2 is intensity-modulated and output as signal light through the single-mode optical fiber 7.

According to the present embodiment, it is possible to provide a highly reliable optical module in which the light-emitting element and optical function element that differ from each other in thermal expansion coefficient are mounted in one casing.

Figure 8A:
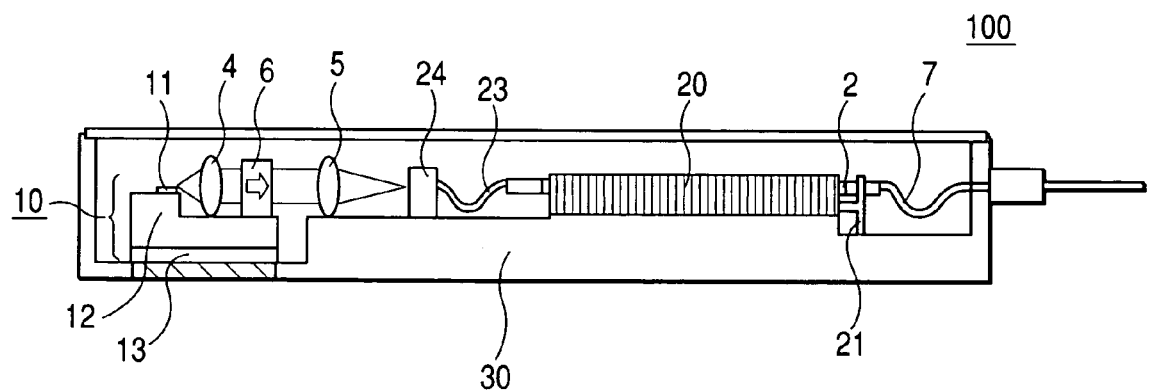
FIGS. 8A and 8B are structural views of a further optical module, explaining a fifth embodiment of the present invention.
Figure 8B:
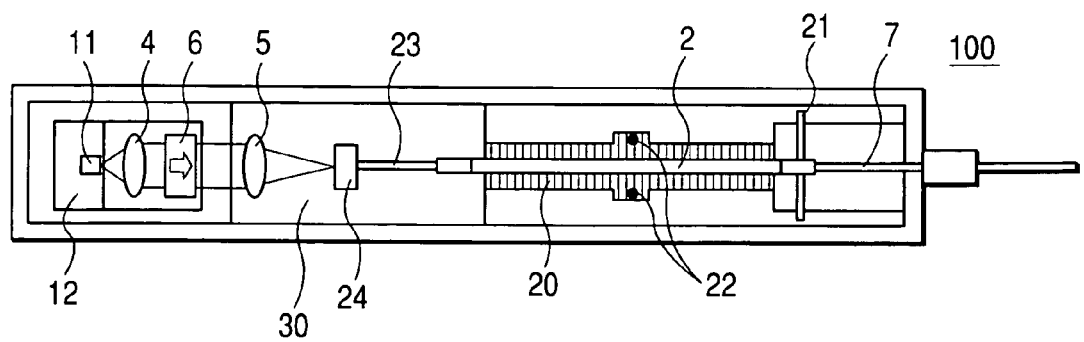

A fifth embodiment of the present invention will be described using FIGS. 8A and 8B. FIGS. 8A, 8B are views explaining a structure of a further optical module, FIG. 8A is a sectional view showing major sections of the optical module, and FIG. 8B is a plan view showing the major sections of the optical module.

Although structurally similar to the optical module of the fourth embodiment, the optical module of the fifth embodiment applies the mount 20 described in the second embodiment, and the mount 20 is YAG-welded to a casing 30. In the present embodiment, therefore, construction and operation of its optical module are not described herein since they can be easily understood from the above two embodiments.

In the present embodiment, although a groove for an optical modulator element 2 is also formed in the mount 20, the groove is formed merely for mechanical protection since the optical modulator element 2 uses optical fibers 23 and 7 at its light-incident and light-exit ends, respectively.

The above-described construction structurally completes the optical module 100 having the light-emitting element 11 and the optical modulator element 2 mounted in the same casing. Electrical signal wiring, although not shown, is actually provided so that: the light-emitting element 11 continuously emits light, and the light introduced into the optical modulator element 2 is intensity-modulated and output as signal light through the single-mode optical fiber 7.

According to the present embodiment, it is possible to provide a highly reliable optical module in which the light-emitting element and optical function element that differ from each other in thermal expansion coefficient are mounted in one casing.

We claim:

1. An optical module comprising:
a light-emitting element;
an optical function element which, after receiving first light input from said light-emitting element, outputs second light that differs from the first light in terms of characteristics; and
a casing adapted to mount said light-emitting element and said optical function element therein;
wherein the following relationship is satisfied between a first thermal expansion coefficient α1 of said light-emitting element, a second thermal expansion coefficient α2 of said optical function element, and a third thermal expansion coefficient α3 of said casing:

$|\alpha 1 - \alpha 3| < 5 \times 10^{-6}$ [1/K]

$|\alpha 2 - \alpha 3| \geq 5 \times 10^{-6}$ [1/K].

2. The optical module according to claim 1,
wherein said optical function element is an optical modulation element, and the second light is modulated light.

3. The optical module according to claim 1,
wherein said optical function element is a wavelength conversion element, and the second light is wavelength-converted light.

4. An optical module comprising:
a light-emitting element;
an optical function element which, after receiving first light input from said light-emitting element, outputs second light that differs from the first light in terms of characteristics; and
a casing adapted to mount said light-emitting element and said optical function element therein;
wherein a difference between a first thermal expansion coefficient of said optical function element and a second thermal expansion coefficient of said casing is at least $5 \times 10^{-6}$ [1/K], and a fixing width in an optical-axis direction between said optical function element and said casing is equal to or less than 10 mm.

5. The optical module according to claim 4,
wherein the fixing width is equal to or less than 3 mm.

6. The optical module according to claim 4,
wherein said optical function element and said casing are fixed to each other at an input end of said optical function element.

7. The optical module according to claim 5,
wherein said optical function element and said casing are fixed to each other at an input end of said optical function element.

8. An optical module comprising:
a light-emitting element;
an optical function element which, after receiving first light input from said light-emitting element, outputs second light that differs from the first light in terms of characteristics;
a mount on which said optical function element is mounted; and
a casing adapted to mount said light-emitting element and said mount therein;
wherein a difference between a first thermal expansion coefficient of said mount and a second thermal expansion coefficient of said casing is at least $5 \times 10^{-6}$ [1/K], and a fixing width in an optical-axis direction between said mount and said casing is equal to or less than 10 mm.

9. The optical module according to claim 8,
wherein the fixing width is equal to or less than 3 mm.

10. The optical module according to claim 8,
wherein said mount and said casing are fixed to each other at an input end of said optical function element.

11. The optical module according to claim 9,
wherein said mount and said casing are fixed to each other at an input end of said optical function element.

12. The optical module according to claim 8,
wherein the optical module is manufactured in such a manner as to achieve approximate matching between a light-incident height of said optical function element and a height of a fixing position of said mount in said casing.

13. The optical module according to claim 9,
wherein the optical module is manufactured in such a manner as to achieve approximate matching between a light-incident height of said optical function element and a height of a fixing position of said mount in said casing.

* * * * *